US012069527B2

(12) United States Patent
Chisu et al.

(10) Patent No.: US 12,069,527 B2
(45) Date of Patent: Aug. 20, 2024

(54) CALL RECOVERY FOR FAILURE

(71) Applicant: Motorola Mobility LLC, Chicago, IL (US)

(72) Inventors: Daniel C Chisu, Franklin Park, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/061,313

(22) Filed: Dec. 2, 2022

(65) Prior Publication Data

US 2023/0094307 A1 Mar. 30, 2023

Related U.S. Application Data

(62) Division of application No. 17/376,938, filed on Jul. 15, 2021, now Pat. No. 11,523,318.

(51) Int. Cl.
*H04W 36/12* (2009.01)
*H04W 36/16* (2009.01)
*H04L 65/1063* (2022.01)

(52) U.S. Cl.
CPC ......... *H04W 36/125* (2018.08); *H04W 36/16* (2013.01); *H04L 65/1063* (2013.01)

(58) Field of Classification Search
CPC .............. H04W 36/125; H04W 36/16; H04W 36/0022; H04W 88/06; H04W 76/18; H04L 65/1063; H04L 65/1069; H04L 65/1095
See application file for complete search history.

(56) References Cited

U.S. PATENT DOCUMENTS

| 7,903,806 | B1 | 3/2011 | Pester, III |
| 9,077,785 | B2 | 7/2015 | Shuman et al. |
| 9,674,761 | B2 | 6/2017 | Balasubramanian et al. |
| 9,930,578 | B2 | 3/2018 | Vashi et al. |
| 10,757,602 | B2 | 8/2020 | Zhang et al. |
| 10,972,893 | B1 * | 4/2021 | Vangala .................. H04W 4/46 |
| 11,197,206 | B1 * | 12/2021 | Oroskar ................ H04W 36/30 |
| 11,218,516 | B1 * | 1/2022 | Velusamy ............... H04L 65/80 |
| 11,470,675 | B2 | 10/2022 | Chisu et al. |
| 11,523,318 | B1 | 12/2022 | Chisu et al. |
| 2005/0186960 | A1 * | 8/2005 | Jiang ................... H04L 65/1083 455/445 |
| 2006/0183472 | A1 | 8/2006 | Nookala et al. |

(Continued)

FOREIGN PATENT DOCUMENTS

| CN | 111372327 | 7/2020 |
| CN | 111698772 | 9/2020 |

OTHER PUBLICATIONS

"Fixed Line Backup", Robustel [online][retrieved May 11, 2021]. Retrieved from the Website <https://www.robustel.com/retail/fixed-line-backup/>., 5 pages.

(Continued)

*Primary Examiner* — Hashim S Bhatti
(74) *Attorney, Agent, or Firm* — FIG. 1 Patents (57) ABSTRACT

Techniques for call recovery for call failure are described and may be implemented via a wireless device to adapt to a variety of different wireless scenarios. For instance, when multiple call failures for a call occur over a particular set of radio access technologies, an IP-based call and/or a direct device-to-device call can be implemented to complete the call.

20 Claims, 8 Drawing Sheets

(56) References Cited

U.S. PATENT DOCUMENTS

| | | | |
|---|---|---|---|
| 2006/0209798 A1* | 9/2006 | Oikarinen | H04L 41/06 370/465 |
| 2007/0127652 A1 | 6/2007 | Divine et al. | |
| 2007/0183394 A1 | 8/2007 | Khandelwal et al. | |
| 2008/0026768 A1* | 1/2008 | Fok | H04W 24/08 455/452.2 |
| 2008/0118042 A1 | 5/2008 | Hogg | |
| 2008/0160989 A1 | 7/2008 | Favre et al. | |
| 2008/0205413 A1* | 8/2008 | Purnadi | H04W 36/0022 455/552.1 |
| 2008/0261600 A1 | 10/2008 | Somasundaram et al. | |
| 2010/0040020 A1 | 2/2010 | Chen | |
| 2010/0173633 A1 | 7/2010 | Catovic et al. | |
| 2010/0234029 A1 | 9/2010 | Ishii et al. | |
| 2010/0272025 A1 | 10/2010 | Yu | |
| 2011/0002272 A1 | 1/2011 | Motohashi et al. | |
| 2011/0110302 A1 | 5/2011 | Faurie et al. | |
| 2011/0188451 A1 | 8/2011 | Song et al. | |
| 2011/0242975 A1 | 10/2011 | Zhao et al. | |
| 2011/0250925 A1 | 10/2011 | Han | |
| 2012/0009939 A1 | 1/2012 | Islam et al. | |
| 2013/0021933 A1 | 1/2013 | Kovvali et al. | |
| 2013/0094446 A1 | 4/2013 | Swaminathan | |
| 2013/0279442 A1 | 10/2013 | Tiwari | |
| 2013/0329567 A1 | 12/2013 | Mathias et al. | |
| 2013/0346494 A1* | 12/2013 | Nakfour | H04W 76/14 709/204 |
| 2014/0112194 A1* | 4/2014 | Novlan | H04W 76/14 370/254 |
| 2014/0219272 A1 | 8/2014 | Shuman et al. | |
| 2014/0242996 A1 | 8/2014 | Nakamura et al. | |
| 2014/0269615 A1 | 9/2014 | Greenwalt, III | |
| 2015/0023277 A1 | 1/2015 | Kim et al. | |
| 2015/0063173 A1* | 3/2015 | White | H04L 65/1069 370/261 |
| 2015/0117406 A1 | 4/2015 | Kim et al. | |
| 2015/0163701 A1* | 6/2015 | Yenamandra | H04W 60/005 370/332 |
| 2015/0201363 A1* | 7/2015 | Lundqvist | H04W 40/12 370/252 |
| 2015/0237544 A1 | 8/2015 | Jeong et al. | |
| 2015/0245388 A1* | 8/2015 | Yerrabommanahalli | H04L 65/1016 455/404.1 |
| 2015/0350965 A1 | 12/2015 | Kabadi et al. | |
| 2016/0044545 A1 | 2/2016 | Yang et al. | |
| 2016/0065733 A1* | 3/2016 | Huh | H04W 76/19 455/566 |
| 2016/0100336 A1 | 4/2016 | Basavarajappa et al. | |
| 2016/0105830 A1 | 4/2016 | Chin et al. | |
| 2016/0112941 A1* | 4/2016 | Desai | H04L 12/145 370/329 |
| 2016/0330655 A1 | 11/2016 | Vashi et al. | |
| 2016/0366619 A1 | 12/2016 | Yang et al. | |
| 2017/0111514 A1 | 4/2017 | Chandrasekaran et al. | |
| 2017/0238220 A1 | 8/2017 | Ohlarik et al. | |
| 2017/0303181 A1 | 10/2017 | Gupta et al. | |
| 2020/0045168 A1 | 2/2020 | Sinha | |
| 2020/0162879 A1* | 5/2020 | Lotfallah | H04W 4/90 |
| 2020/0296788 A1 | 9/2020 | Wirtanen et al. | |
| 2020/0413317 A1 | 12/2020 | Gao et al. | |
| 2021/0037430 A1 | 2/2021 | Jin et al. | |
| 2021/0297840 A1* | 9/2021 | Ding | H04W 4/02 |
| 2022/0286919 A1 | 9/2022 | Chisu et al. | |
| 2022/0287129 A1 | 9/2022 | Chisu et al. | |

OTHER PUBLICATIONS

"IMS Service Centralization and Continuity Guidelines", GSM Association, Version 13.0 [retrieved Apr. 7, 2021]. Retrieved from the Internet <https://www.gsma.com/newsroom/wp-content/uploads/IR.64-v13.0.pdf>., Feb. 2, 2016, 23 pages.

"Multiple description coding", Wikipedia, The Free Encyclopedia [retrieved May 11, 2021]. Retrieved from the Internet <https://en.wikipedia.org/wiki/Multiple_description_coding>., 2 pages.

"Notice of Allowance", U.S. Appl. No. 17/191,246, Apr. 29, 2022, 8 pages.

U.S. Appl. No. 17/191,246, , "Corrected Notice of Allowability", U.S. Appl. No. 17/191,246, Aug. 24, 2022, 2 pages.

U.S. Appl. No. 17/191,246, , "Notice of Allowance", U.S. Appl. No. 17/191,246, Jun. 1, 2022, 8 pages.

U.S. Appl. No. 17/191,316, , "Corrected Notice of Allowability", U.S. Appl. No. 17/191,316, Sep. 8, 2022, 2 pages.

U.S. Appl. No. 17/191,316, , "Non-Final Office Action", U.S. Appl. No. 17/191,316, May 18, 2022, 12 pages.

U.S. Appl. No. 17/191,316, , "Notice of Allowance", U.S. Appl. No. 17/191,316, Aug. 11, 2022, 7 pages.

U.S. Appl. No. 17/376,938, , "Notice of Allowance", U.S. Appl. No. 17/376,938, Sep. 16, 2022, 9 pages.

U.S. Appl. No. 17/376,938, , "Supplemental Notice of Allowability", U.S. Appl. No. 17/376,938, Nov. 1, 2022, 4 pages.

Al-Mualla, Mohammed E. et al., "Chapter 10—Error Concealment Using Motion Field Interpolation", in Signal Processing and its Applications, Video Coding for Mobile Communications, Academic Press [retrieved May 11, 2021]. Retrieved from the Internet <http://160592857366.free.fr/joe/ebooks/Electronics,%20and%20Electrical%20Engineering%20Collection/AL-MUALLA,%20M.%20E.%20(2001).%20Video%20Coding%20for%20Mobile%20Communications%20-%20Efficiency,%20Complexity,%20and%20Resilie/Video_Coding_for_Mobile_Communications.pdf>, 2002, pp. 231-257.

Baharudin, Muhammad A. et al., "Improvement of Handover Performance Based on Bio-Inspired Approach with Received Signal Strength and Mean Opinion Score", Arab J Sci Eng, vol. 40 [retrieved May 11, 2021]. Retrieved from the Internet <https://doi.org/10.1007/s13369-015-1638-5>., Apr. 4, 2015, 14 pages.

Chisu, Daniel C. et al., "US Application as Filed", U.S. Appl. No. 17/191,246, filed Mar. 3, 2021, 79 pages.

GB2209918.8, , "Combined Search and Examination Report", GB Application No. GB2209918.8, Nov. 15, 2022, 11 pages.

Jadhav, Sheetal et al., "MOS-based Handover Protocol for Next Generation Wireless Networks", AINA '12: Proceedings of the 2012 IEEE 26th International Conference on Advanced Information Networking and Applications [retrieved May 11, 2021]. Retrieved from the Internet <http://www.cs.otago.ac.nz/staffpriv/hzy/papers/aina2012.pdf>., Mar. 2012, 8 pages.

Jaganathan, Suresh et al., "High Quality of Service on Video Streaming in P2P Networks using FST-MDC", International Journal of Multimedia & Its Applications (IJMA), vol. 3, No. 2 [retrieved May 11, 2011]. Retrieved from the Internet <https://arxiv.org/ftp/arxiv/papers/1105/1105.5641.pdf>., May 2011, 11 pages.

Keller, Ralf, "Voice in 5G system—architecture and EPS fallback", Ericsson Blog, Ericsson Group [retrieved Apr. 7, 2021]. Retrieved from the Internet <https://www.ericsson.com/en/blog/2018/9/voice-in-5g-systemarchitecture-and-eps-fallback>., Sep. 24, 2018, 4 pages.

Krishna K, Bala Murali et al., "A Dynamic Link Aggregation Scheme for Heterogeneous Wireless Networks", 2014 IEEE International Conference on Electronics, Computing and Communication Technologies (CONECCT) [retrieved May 11, 2021]. Retrieved from the Internet <https://newslab.iith.ac.in/networks/downloads/adynamic.pdf>., Jan. 2014, 6 pages.

Pedrini, Leonardo Z. , "What is CSFB and SRVCC in LTE?", telecomHall Forum Blog [retrieved Apr. 7, 2021]. Retrieved from the Internet <https://www.telecomhall.net/t/what-is-csfb-and-srvcc-in-lte/6279>., Oct. 23, 2019, 21 pages.

Sauter, Martin , "VoLTE and VoWifi—Wireless Telephony Has Truly Become Network Independent", WirelessMoves Blog [retrieved May 11, 2021]. Retrieved from the Internet <https://blog.wirelessmoves.com/2016/08/volte-and-vowifi-wireless-telephony-has-truly-become-network-independent.html>., May 1, 2016, 2 pages.

\* cited by examiner

CALL RECOVERY FOR FAILURE

RELATED APPLICATION

This application is a divisional of and claims priority to U.S. patent application Ser. No. 17/376,938, filed Jul. 15, 2021, entitled "Call Recovery for Multiple Call Failures", the entire disclosure of which is hereby incorporated by reference herein in its entirety.

BACKGROUND

Wireless communication is ubiquitous and is used for a multitude of purposes, including wireless voice and data communication. Further, wireless protocols are constantly evolving to provide increased service levels for wireless users. Accordingly, a variety of different radio access technologies (RAT) are available for implementing wireless communication, including 3G, 4G Long Term Evolution (LTE), 5G (e.g., 5G New Radio (NR)), WiFi, and so forth. A single wireless device (e.g., a mobile phone) typically supports multiple different RATs and thus can switch between them in response to different conditions. For instance, when a call fails on a first RAT, the call can be attempted on a second, different RAT. Conventional implementations for RAT switching, however, typically cannot accommodate scenarios where multiple call attempts on multiple different RATs fail.

BRIEF DESCRIPTION OF THE DRAWINGS

Aspects of call recovery for call failure are described with reference to the following Figures. The same numbers may be used throughout to reference similar features and components that are shown in the Figures.

DETAILED DESCRIPTION

Techniques for call recovery for call failure are described and may be implemented via a wireless device to connect a call when multiple call failures occur. Generally, the described techniques provide a wireless device with the ability to implement a wireless call when multiple call failures occur, e.g., when call attempts over a set of primary radio access technologies (RATs) fail. For instance, consider a scenario where a wireless device (e.g., a wireless cellular phone) attempts to connect a wireless call via a first RAT, e.g., a default RAT for the wireless device. A failure event then occurs as part of the wireless call via the first RAT, such as during call initiation and/or during an established call. The call is then reattempted via a second RAT, e.g., a fallback RAT. One example of such a remedial process is a circuit switched fallback (CSFB) from a packet-switched call type (e.g., the first RAT) to a circuit switched call type, e.g., the second RAT. The call attempt via the second RAT also fails. In at least one implementation, failure of the call attempts via the first and second RATs occur based on various conditions, such as when a call server is down, e.g., non-functioning. For instance, in a scenario where the first and second RATs are implemented by a particular wireless carrier, the wireless carrier is experiencing a system failure such that wireless service provided by the carrier is unavailable.

Accordingly, in response to the multiple call attempt failures, the wireless device initiates a call attempt via a third RAT, e.g., an internet protocol (IP) call over an internet public data network (PDN). In conjunction with (e.g., prior to) initiating an IP call, a signal condition of an internet connection for the wireless device is determined. For instance, the wireless device determines if wireless connectivity to an IP network is available and whether the wireless connectivity meets a threshold signal condition. The threshold signal condition, for instance, indicates that the wireless connectivity is operationally stable and/or meets a threshold (e.g., minimum) signal strength and/or a threshold (e.g., minimum) signal quality. Generally, various types of signal quality attributes can be considered, such as wireless signal-to-noise ratio, signal errors, packet errors, dropped packets, and so forth.

Accordingly, if a wireless internet connection is available that meets the threshold signal condition, the call is initiated as an IP call over the IP network. In at least one implementation, the IP call is implemented utilizing a particular communication application available to the wireless device, such as a voice/video over IP application, a teleconferencing application, an online collaboration application, and so forth. The communication application, for example, represents a default communication application for the wireless device and/or a communication application indicated as a user-preferred application for an IP call. Thus, the IP call is established with a called device as an IP-based call. Generally, the process of establishing the IP call in response to the multiple call failures can be implemented automatically and in response to the multiple call failures, e.g., without further user interaction after the initial call attempt. For instance, initiating the IP call is performed as an automated call process that occurs in response to detecting the multiple call failures.

In at least one implementation, in response to the multiple call failures, a direct device-to-device call can also be initiated. For instance, if an IP network is not available and/or does not meet a threshold signal condition, a wireless device determines whether a device to be called is in range (e.g., within sufficient physical proximity) for a direct device-to-device wireless connection such as using a short-range wireless RAT. If the device to be called is in range, a direct device-to-device connection is established and utilized to exchange communication media. Accordingly, a variety of connectivity options are provided for completing a call when multiple call failures occur utilizing an initial set of RATs.

While features and concepts discussed herein can be implemented in any number of different devices, systems, environments, and/or configurations, aspects of the described implementations are described in the context of the following example devices, systems, and methods.

Figure 1:
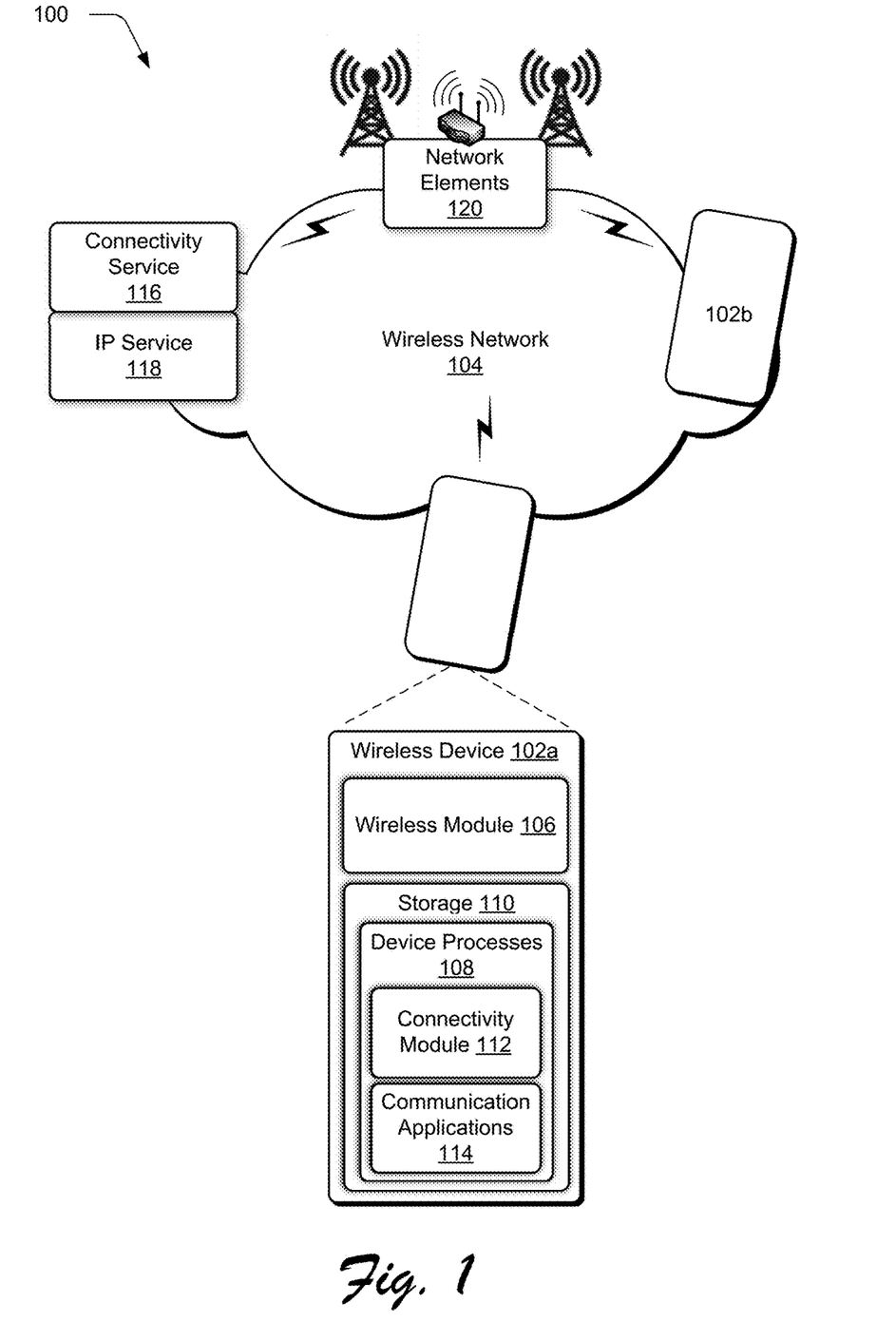
FIG. 1 illustrates an example environment in which aspects of call recovery for call failure can be implemented.

FIG. 1 illustrates an example environment 100 in which aspects of call recovery for call failure can be implemented. The example environment 100 includes a wireless computing device ("wireless device") 102a that is connectable to a wireless network 104. In this particular example, the wireless device 102a represents a portable device that can be carried by a user, such as a smartphone, a tablet device, a laptop, a wearable computing device, (e.g., a smartwatch or a fitness tracker), and so forth. These examples are not to be construed as limiting, however, and the wireless device 102a can be implemented in a variety of different ways and form factors. Further example attributes of the wireless device 102a are discussed below with reference to the device 800 of FIG. 8.

The wireless device 102a includes various functionality that enables the wireless device 102a to perform different aspects of call recovery for call failure discussed herein, including a wireless module 106 and device processes 108 stored on a storage 110 of the wireless device 102a. The wireless module 106 represents functionality (e.g., hardware and logic) that enables the wireless device 102a to communicate wirelessly, such as for wireless data and voice communication. The wireless module 106, for instance, includes functionality to support different wireless protocols, such as wireless cellular (e.g., 2G, 3G, 4G, 5G, etc.), wireless broadband, Wireless Local Area Network (WLAN) (e.g., Wi-Fi), Wi-Fi Direct, wireless short distance communication (e.g., Bluetooth™ (including Bluetooth™ Low Energy (BLE), ultra-wideband (UWB)), Near Field Communication (NFC)), New Radio (NR) sidelink, and so forth. The wireless module 106 includes various components such as antennas, a transceiver, a modem, an analog-to-digital converter (ADC), a digital-to-analog converter (DAC), a mixer, and so forth.

The device processes 108 are representative of logic that is executable by the wireless device 102a to perform various tasks, examples of which include applications, system processes, an operating system, and so forth. The device processes 108 include a connectivity module 112 and communication applications 114. The connectivity module 112 represents functionality for implementing aspects of call recovery for call failure described herein. The connectivity module 112, for instance, monitors connectivity status and other wireless-related events of the wireless device 102a. In at least one implementation, the connectivity module 112 executes at an application layer of the wireless device 102a. This is not to be construed as limiting, however, and in other implementations the connectivity module 112 can be implemented in a different layer and/or portions of the wireless device 102a. The communication applications 114 represent functionality for enabling IP-based communication for the wireless device 102a, such as voice, text, video, and content communication.

The environment 100 further includes a wireless device 102b which represents a device that is able to communicate wirelessly with the wireless device 102a over the wireless network 104 and/or via direct wireless communication. In at least one implementation, the wireless device 102b represents a different instance of the wireless device 102a, e.g., instances of the functionality discussed with reference to the wireless device 102a also reside on the wireless device 102b. Further example features of the wireless devices 102a, 102b are discussed below with reference to the device 800 of FIG. 8.

The environment 100 also includes a connectivity service 116 and an IP service 118 that are able to provide different types of wireless connectivity for the wireless devices 102a, 102b. The connectivity service 116, for instance, provides connectivity via packet switched and circuit switched connectivity. In at least one implementation, the connectivity service 116 implements different RATs according to the 3rd Generation Partnership Project (3GPP) protocols such as via an IP Multimedia Subsystem (IMS) architecture. The IP service 118 represents a service that provides wireless IP connectivity for the wireless devices 102a, 102b, such as via an Internet-based public data network (PDN). While the connectivity service 116 and the IP service 118 are illustrated as separate entities, the connectivity service 116 and the IP service 118 are implementable in different ways, such as via separate architectures or via a common integrated architecture that provides connectivity via different RATs.

To enable wireless communication over the wireless network 104, the environment 100 includes different network elements 120. Generally, the different network elements 120 provide wireless service utilizing different RATs and are implemented in different ways, such as wireless base stations, wireless nodes, wireless routers, and so forth. In at least one implementation, each network element 120 provides wireless connectivity via a different RAT. Examples of the network elements 120 include connectivity points (e.g., gNB) for 5G New Radio (NR) wireless connectivity, connectivity points (Evolved Node B (eNodeB)) for 4G LTE, 3G base stations, 2G base stations, WiFi access points, and so forth. These examples are not to be construed as limiting and the network elements 120 can be implemented using any suitable RAT. In at least one implementation, at least some of the network elements 120 implement different public data network (PDN) types. Generally, the connectivity service 116 and the IP service 118 utilize different instances of the network elements 120 to provide wireless connectivity via different RATs.

Figure 2:
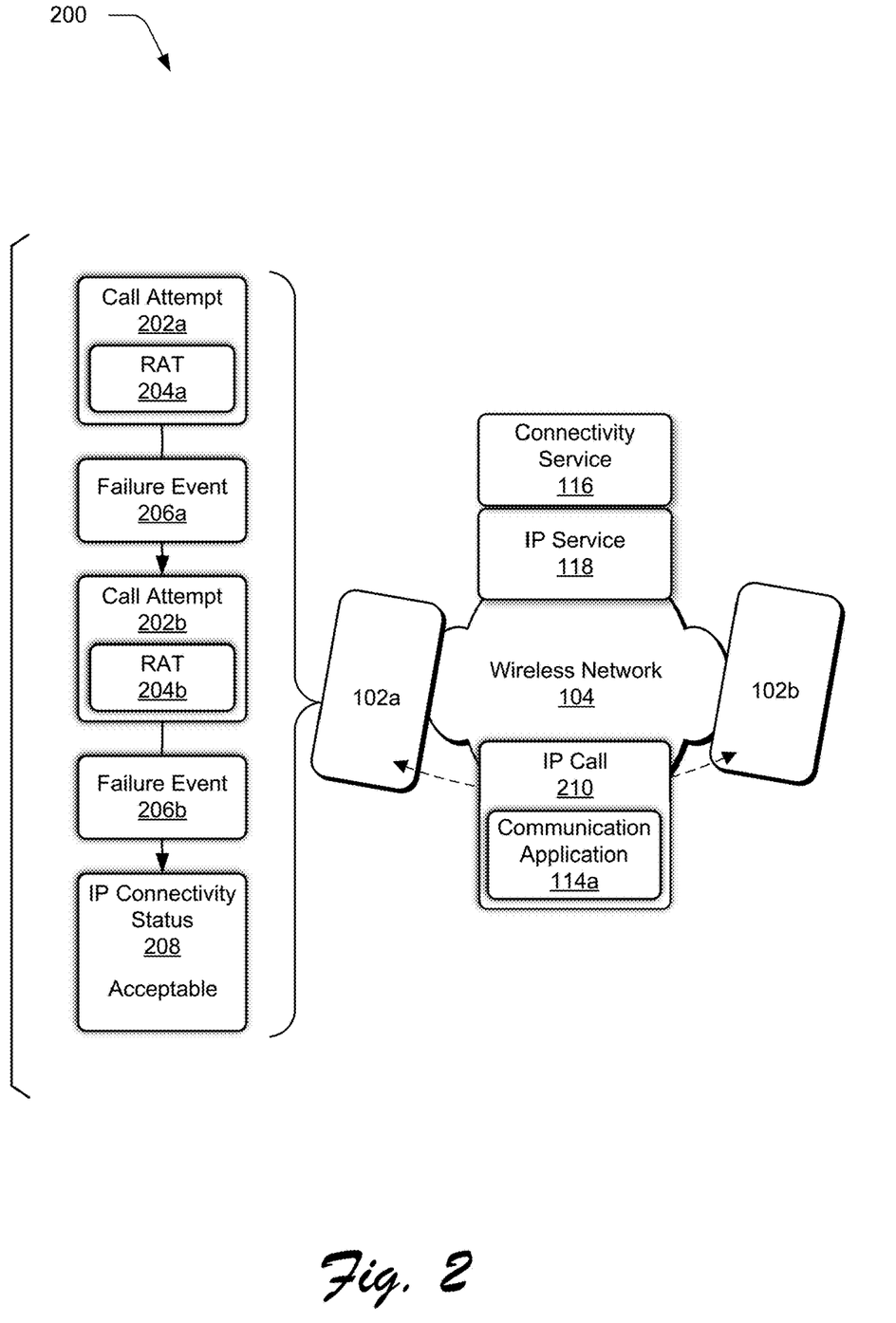
FIG. 2 depicts a scenario for implementing an IP call in response to multiple call attempt failures in accordance with one or more implementations.

FIG. 2 depicts a scenario 200 for implementing an IP call in response to multiple call attempt failures in accordance with one or more implementations. In the scenario 200, a call attempt 202a occurs in which the wireless device 102a attempts to establish a call with the wireless device 102b. A user, for instance, interacts with the wireless device 102a to initiate the call attempt 202a. The call attempt 202a occurs at the wireless device 102a via a RAT 204a. The RAT 204a, for example, represents a default RAT to be utilized by the wireless device 102a at a current location of the wireless device 102a. Nonlimiting examples of the RAT 204a include a packet-switched technology such as 5G, 4G LTE, etc. In at least one implementation the RAT 204a is implemented by the connectivity service 116.

Based on the call attempt 202a a failure event 206a occurs indicating that the call attempt 202a is not successful. For instance, wireless service based on the RAT 204a is not currently functional at a location of the wireless device 102a and thus the failure event 206a occurs. Accordingly, a second call attempt 202b is initiated utilizing a RAT 204b, e.g., a different RAT than the RAT 204a. In one non-limiting example the call attempt 202b is implemented as part of a circuit switched fallback (CSFB) from a packet-switched call type (e.g., the call attempt 202a) to a circuit switched call type, e.g., the call attempt 202b. The RAT 204b, for instance, represents a circuit-switched RAT. Based on the call attempt 202b a further failure event 206b occurs indicating that the call attempt 202b is not successful. Wireless service based on the RAT 204b, for example, is not currently functional at a location of the wireless device 102a and thus the failure event 206b occurs.

Accordingly, based on the failure event 206b, an IP connectivity status 208 is determined. The connectivity module 112, for instance, determines that multiple call failure events occur and thus queries the wireless module 106 for the IP connectivity status 208 of the wireless device 102a. In this particular example, the IP connectivity status 208 indicates that IP connectivity status of the wireless device 102a is "acceptable," e.g., is operationally stable and/or meets a threshold signal strength and/or signal quality. In at least one implementation, the IP connectivity status 208 is based on connectivity of the wireless device 102a to an Internet PDN. As an alternative or additional implementation, determining the IP connectivity status 208 includes establishing a connection to a wireless IP network, e.g., when the wireless device 102a is not currently connected to an IP network.

Accordingly, based on establishing the IP connectivity status 208, an IP call 210 is established between the wireless device 102a and the wireless device 102b over the network 104. The IP call 210, for instance, represents a communication session established between instances of a communication application 114a running on and/or accessible to the wireless devices 102a, 102b. In at least one implementation, as part of initiating the IP call 210, the connectivity module 112 determines whether the communication application 114a is available and/or running on the wireless device 102b, and/or whether a user account is logged in for the communication application 114a on the wireless device 102b. Generally, the IP call 210 includes an exchange of communication media between the instances of the communication application 114a on the wireless devices 102a, 102b, such as voice, text, video, content, and so forth. While the IP call 210 is discussed with reference to a call between the wireless devices 102a, 102b, the IP call 210 can also be utilized to contact other entities and/or services that are accessible utilizing IP-based communication, such as an emergency services entity.

According to one or more implementations, if the IP connectivity status 208 indicates that IP connectivity of the wireless device 102a is not acceptable (e.g., is below a threshold signal strength and/or signal quality) the IP call 210 is not attempted. For instance, a notification is presented on the wireless device 102a indicating that the call attempt(s) failed, e.g., by the connectivity module 112.

As a further example implementation, in conjunction with (e.g., before) initiating the IP call 210, a user notification is presented on the wireless device 102a indicating that the IP call 210 is being initiated. The notification, for instance, indicates that a call attempt using primary wireless protocols of the wireless device 102a failed and thus the IP call 210 is being established. As further detailed below, an example notification includes information about the IP call (e.g., an identity of the communication application 114a) and enables a user to cancel initiation of the IP call.

Figure 3:
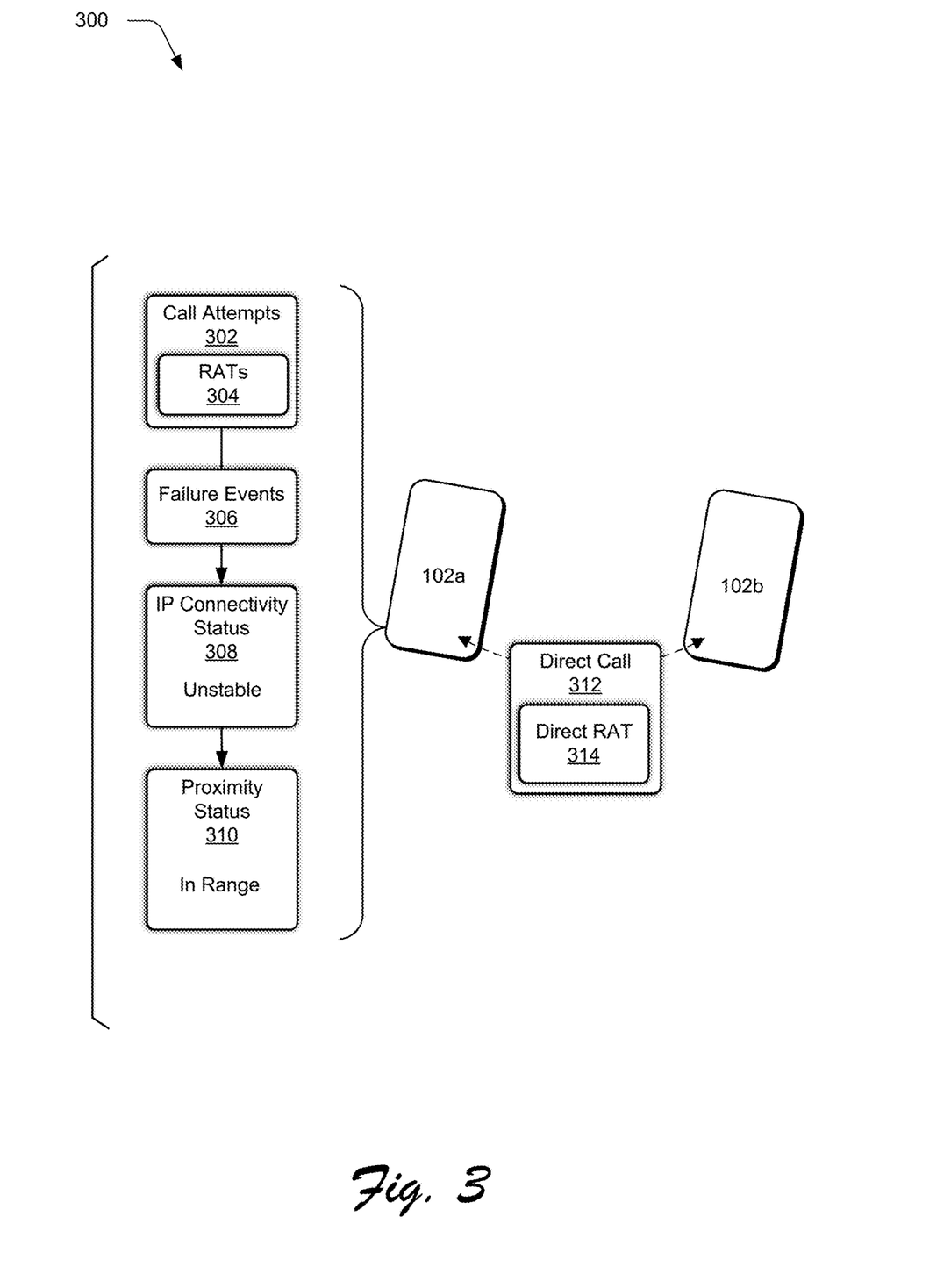
FIG. 3 depicts a scenario for implementing direct device-to-device call in response to multiple call attempt failures in accordance with one or more implementations.

FIG. 3 depicts a scenario 300 for implementing direct device-to-device call in response to multiple call attempt failures in accordance with one or more implementations. In the scenario 300 the wireless device 102a initiates multiple call attempts 302 for a call to the wireless device 102b via different RATs 304, and the call attempts 302 experience multiple failure events 306. In at least one implementation the RATs 304 for the call attempts 302 include multiple wireless cellular RATs, e.g., a default wireless cellular RAT for the wireless device 102a and at least one fallback RAT. Optionally in the scenario 300, an IP connectivity status 308 determines that IP connectivity for the wireless device 102a is unstable, e.g., is not available or is below a threshold signal strength and/or signal quality. The IP connectivity status 308, for example, is determined in response to the failure events 306.

Accordingly, a proximity status 310 for the wireless device 102b is determined to determine whether the wireless device 102b is physically close enough to the wireless device 102a to initiate a direct device-to-device wireless connection with the wireless device 102a. Generally, the proximity status 310 is determinable in various ways, such as by transmitting a wireless detection signal and/or detecting a wireless signal from the wireless device 102b. Accordingly, the proximity status 310 determines that the wireless device 102b is in range for direct wireless communication between the wireless devices 102a, 102b. A direct call 312 (e.g., a peer-to-peer call) is then established between the wireless devices 102a, 102b via a direct RAT 314. Examples of the direct RAT 314 include Wi-Fi Direct, Bluetooth™ (including Bluetooth™ Low Energy (BLE), ultra-wideband (UWB), Near Field Communication (NFC)), LTE direct, NR sidelink, and so forth.

Figure 4:
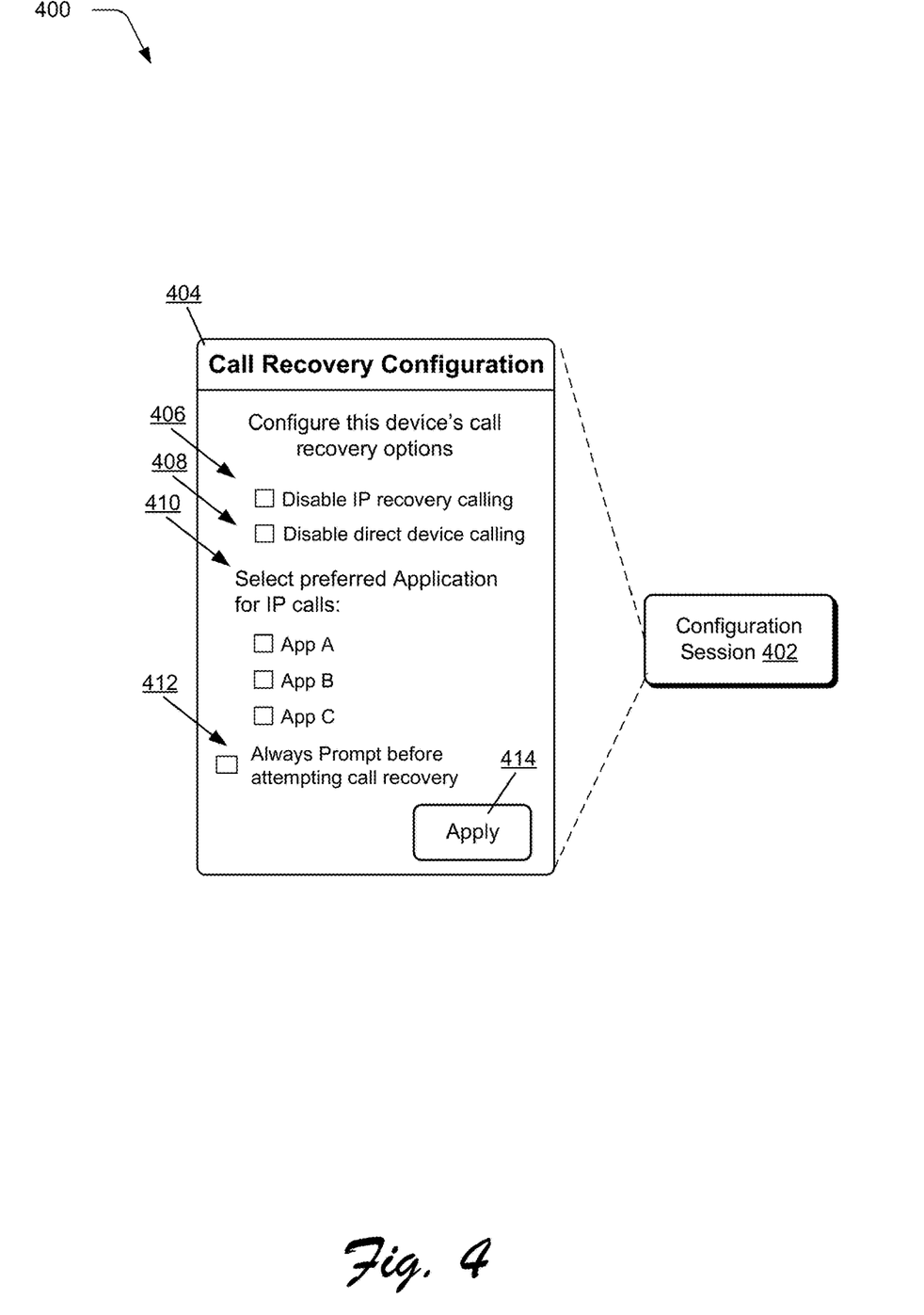
FIG. 4 depicts a scenario for configuring call recovery settings in accordance with one or more implementations.

FIG. 4 depicts a scenario 400 for configuring call recovery settings in accordance with one or more implementations. In the scenario 400 a configuration session 402 is implemented, e.g., by the connectivity module 112. The configuration session 402, for instance, enables a user to configure different call recovery settings. As part of the configuration session 402 a configuration graphical user interface (GUI) 404 is presented that includes different configurable call recovery settings. The configuration GUI 404, for instance, includes an IP call field 406, a direct call field 408, and a preferred application field 410. The IP call field 406 is selectable to disable IP calling for call recovery and the direct call field 408 is selectable to disable direct device-to-device calling for a call recovery. For instance, default settings of the wireless device 102a automatically implement IP calling for call recovery and direct device-to-device calling for call recovery in response to multiple call failures, and the configuration session 402 enables a user to disable these default behaviors. In an alternative implementation IP calling and/or direct device-to-device calling for call recovery are not default behaviors and selectable options to enable these options are presentable as part of the configuration session 402.

The preferred application field 410 includes selectable options for preferred applications for implementing an IP call for call recovery. The applications presented in the preferred applications field 410, for example, represent instances of the communication applications 114. For instance, in scenarios where an IP call for call recovery is attempted, the connectivity module 112 first attempts to utilize a preferred communication application 114 selected via the preferred applications field 410.

The configuration GUI 404 also includes a prompt field 412 and an apply button 414. The prompt field 412 is selectable to cause a notification to be presented when a call recovery is attempted, such as a visual and/or audible notification. In at least one implementation, when a call recovery is attempted, a default setting causes the call recovery to be initiated automatically and without presenting a notification that a call recovery process is being implemented. Thus, the prompt field 412 is selectable to override this default setting and cause a notification of a call recovery process to be presented. The apply button 414 is selectable to cause configuration settings from the configuration GUI 404 to be applied as part of the configuration session 402.

Figure 5:
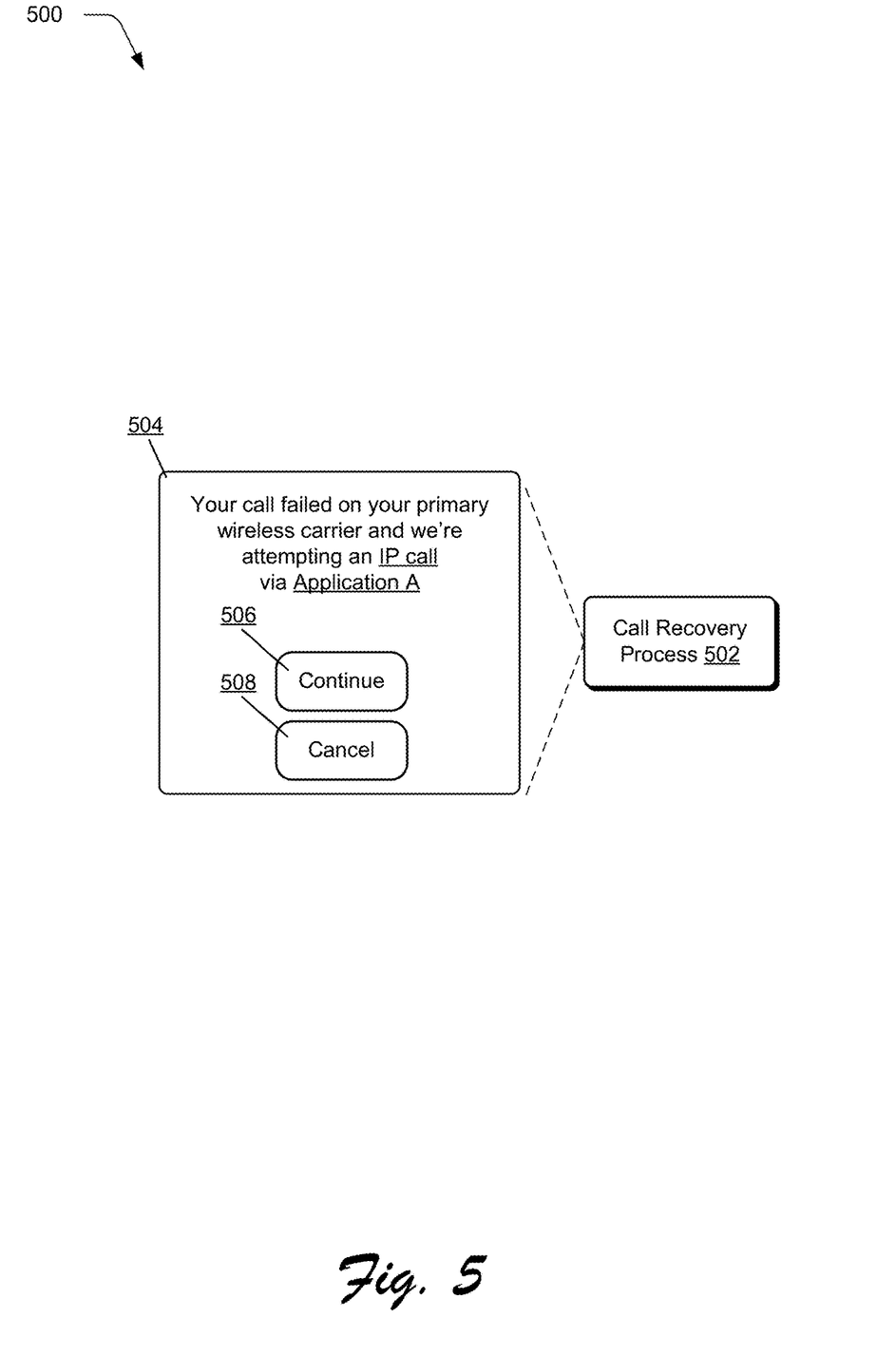
FIG. 5 depicts a scenario for a user prompt in conjunction with attempting a call recovery in accordance with one or more implementations.

FIG. 5 depicts a scenario 500 for a user prompt in conjunction with attempting a call recovery in accordance with one or more implementations. The scenario 500, for example, is implemented in response to an initiation of a call recovery process 502 such as when multiple call attempts via different RATs fail. Examples of the call recovery process 502 are presented in the scenarios 200, 300. As part of the call recovery process 502 a call recovery notification 504 is presented, e.g., by the connectivity module 112. In at least one implementation, the call recovery notification 504 is presented based on a user enabling call recovery notifications, e.g., selecting the prompt field 412 from the configuration GUI 404 as part of the configuration session 402. Generally, the call recovery notification 504 notifies a user that a call attempt via a primary wireless protocol failed and a call recovery procedure is being implemented. Further, the call recovery notification 504 includes information about the call recovery process 502 such as a call recovery type (e.g., IP call, direct device-to-device call) and an application being utilized for the call recovery process 502.

Further, the call recovery notification 504 includes a continue control 506 and a cancel control 508. The continue control 506, for instance, is selectable to cause the call recovery process 502 to continue and a call recovery initiation to be attempted. For example, selecting the continue control 506 causes the call recovery notification 504 to be removed from display and the call recovery process 502 to continue. In at least one implementation, in conjunction with the call recovery process 502, the call recovery notification 504 is presented for a specified period of time, e.g., n seconds. After this period of time, the call recovery notification 504 is removed and the call recovery process 502 continues. Accordingly, the continue control 506 is selectable before this period of time elapses to cause the call recovery notification 504 to be removed prior to expiry of the period of time and the call recovery process 502 to proceed.

The cancel control 508 is selectable to cancel the call recovery process 502. For instance, when the call recovery process 502 is initiated and the call recovery notification 504 is presented, a user is able to select the cancel control 508 to terminate the call recovery process 502. As mentioned above the call recovery notification 504 is presentable for a specified period of time. Thus, the cancel control 508 is selectable during this period of time to cancel the call recovery process 502 and if the cancel control 508 is not selected during the time that the call recovery notification 504 is presented, the call recovery notification 504 is removed and the call recovery process 502 proceeds.

Figure 6:
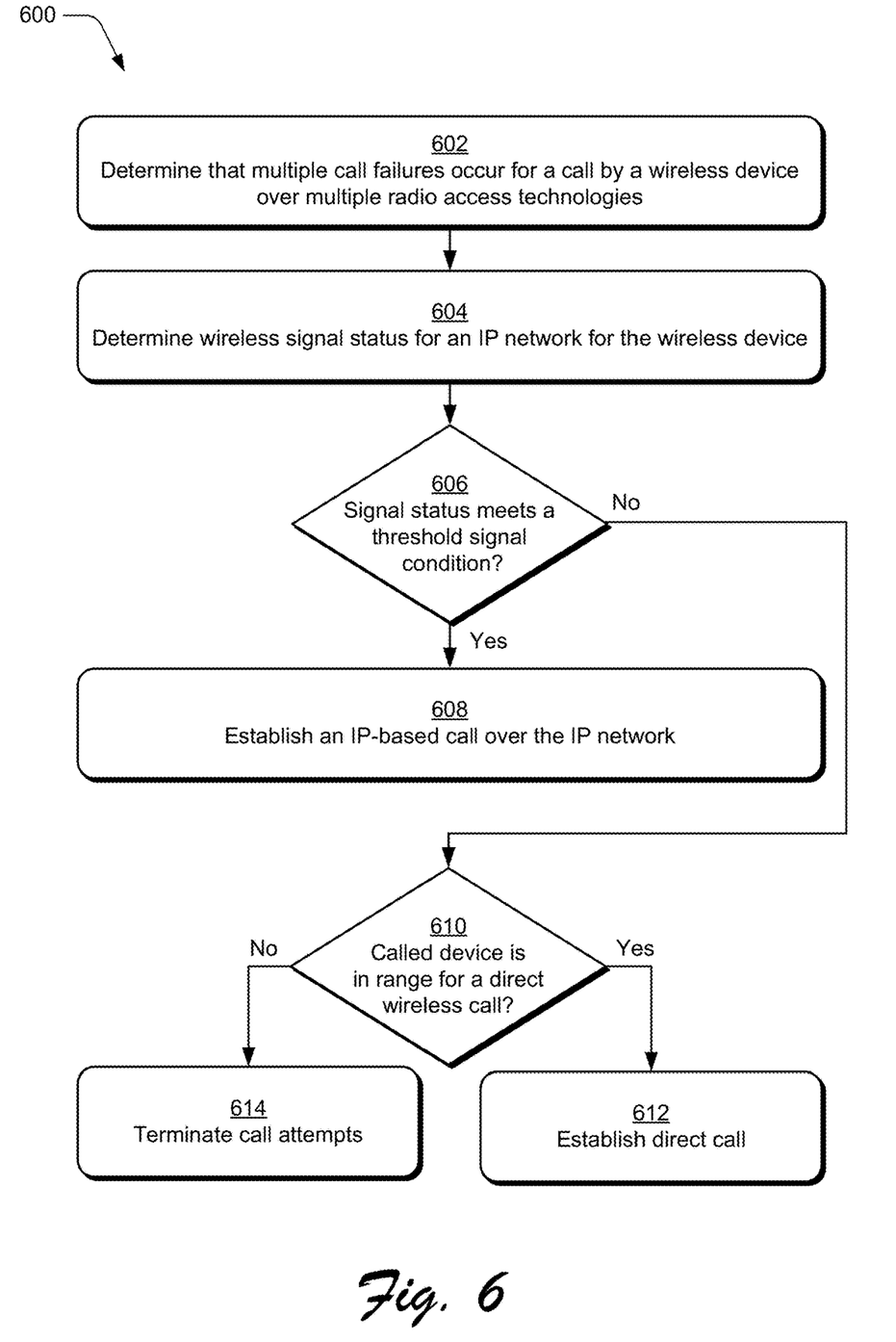
FIG. 6 is a flow diagram that depicts a method for implementing a call recovery in response to multiple call attempt failures in accordance with one or more implementations.

FIG. 6 depicts a method 600 for implementing a call recovery in response to multiple call attempt failures in accordance with one or more implementations. At 602 a determination is made that multiple call failures occur for a call by a wireless device over multiple radio access technologies. A user, for instance, initiates a call on the wireless device 102a and the call is initiated via a first RAT (e.g., a default RAT) and the call experiences a failure. The call is then retried on a second RAT (e.g., a backup RAT) and that call attempt also fails. In at least one implementation, the first RAT and the second RAT represent different wireless cellular RATs such as 5G, 4G LTE, 3G, 2G, etc. Alternatively or additionally, the second RAT represents a fallback RAT such as CSFB.

At 604 a determination is made of a wireless signal status for an IP network for the wireless device. The connectivity module 112, for instance, queries the wireless module 106 to determine whether an IP network is currently available and if so, a signal condition of the IP network. In one or more implementations, an IP network represents an IP PDN. The signal condition, for instance, represents a signal strength and/or signal quality for an IP network, e.g., a WiFi network and/or other wireless IP-type network. In at least one implementation, the IP network is implemented utilizing a RAT that is different than the RATs utilized in conjunction with the multiple call failures, or is implemented utilizing a RAT that is common to a RAT utilized in conjunction with the multiple call failures. For instance, a call utilizing a first call type over a particular RAT may fail (e.g., a voice over LTE (VOLTE) over an LTE network) but IP connectivity may be available via an LTE connection.

At 606 a determination is made whether the signal status for an IP network meets a threshold signal condition. The threshold signal condition, for instance, represents a stable IP connection, a minimum signal strength, and/or a minimum signal quality. Generally, "signal quality" refers to different signal attributes such as whether any signal and/or data errors are detected in wireless signal, such as dropped packets, data errors detected in wireless signal, and so forth.

If the signal status for an IP network meets the threshold signal condition ("Yes") at 608 the call is initiated via the IP network. The connectivity module 112 and the wireless module 106, for instance, cooperatively establish an IP-based call over the IP network. For example, the IP call represents a communication session initiated between different instances of a communication application 114 that reside on different wireless devices. In at least one implementation, a user specifies a preferred communication application 114 (e.g., as part of the configuration session 402) and thus the IP call is established between different instances of the preferred communication application 114. As another example implementation, initiating the call via the IP network includes determining that a called device is online (e.g., logged into) an instance of a communication application 114 and then causing the call to be initiated between instances of the communication application 114. Thus, the call proceeds as an IP-based call over the IP network, such as a voice/video over IP call. As mentioned previously, the IP network may be implemented over a different RAT than was utilized in conjunction with the multiple call failures, or may be implemented as a different call type over a common RAT with a RAT utilized in conjunction with the multiple call failures.

Returning to 606, if the signal status for an IP network does not meet the threshold signal condition ("No"), at 610 a determination is made whether a called device is in range for a direct device-to-device wireless call. The connectivity module 112, for instance, queries the wireless module 106 to determine whether the called device (e.g., the wireless device 102b) is detectable in proximity to the wireless device 102a, such as via a short-range wireless RAT, examples of which are discussed above. The wireless module 106 is able to detect whether the called device is in range for a direct call in various ways, such as by scanning for wireless signal transmission from the called device, sending a wireless query directed to the called device and awaiting a reply signal, and so forth. If the called device is detected in range for a direct device-to-device wireless call ("Yes") at 612 the direct call is established. The wireless devices 102a, 102b, for instance, establish direct wireless connectivity via a short range RAT and exchange communication media over the direct wireless connectivity.

If the called device is not detected in range for a direct device-to-device wireless call ("No") at 614 the call attempts are terminated. The connectivity module 112, for instance, ceases attempting to connect the call. In at least one implementation a user notification is presented indicating that the call failed, e.g., and that call recovery attempts also failed. In an alternative or additional scenario the call is reattempted via the RAT(s) utilized for the initial call attempts, e.g., at 602. For instance, signal conditions may have improved over the initial RAT(s) since the initial call attempts and thus the call can be reattempted over these RAT(s).

Figure 7:
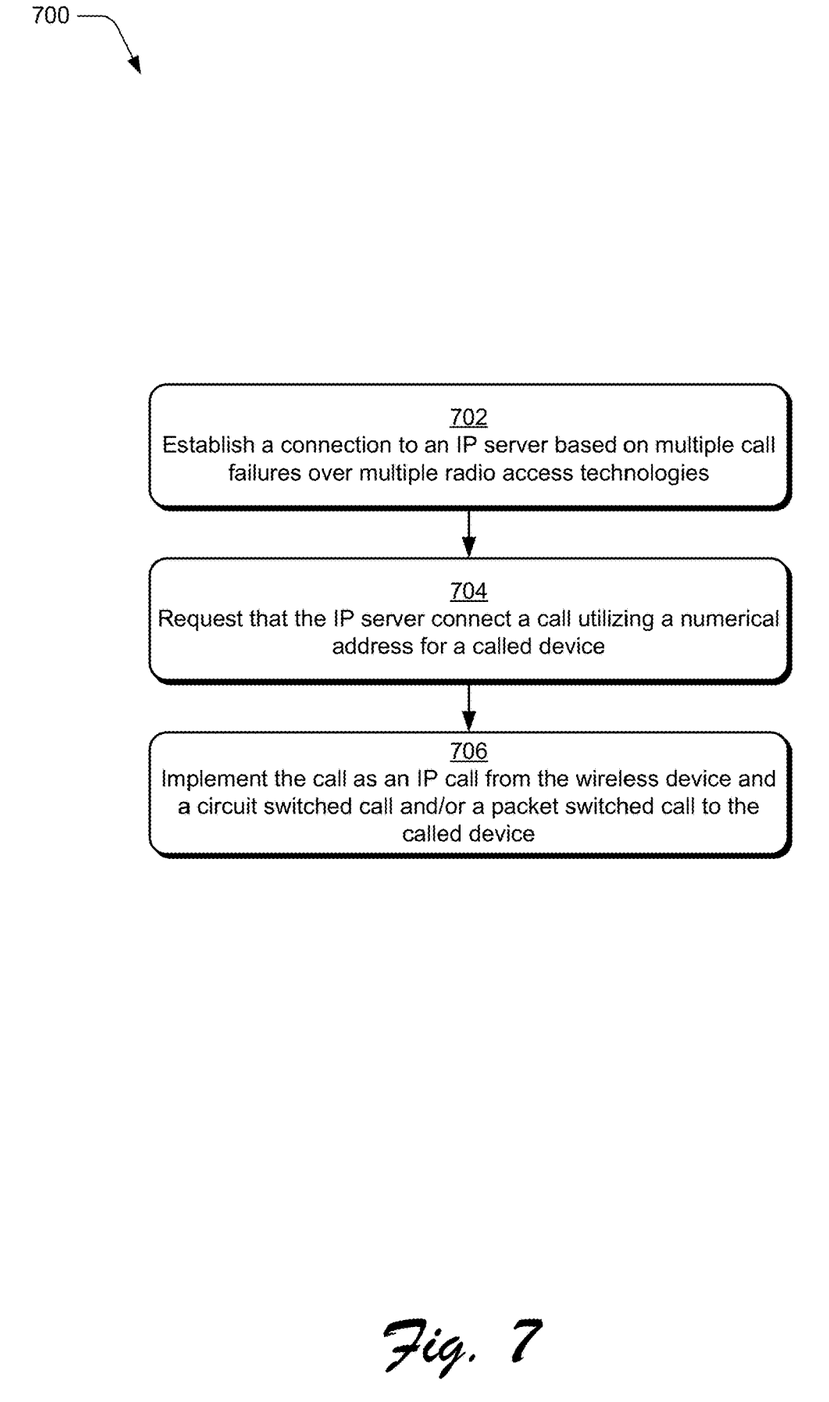
FIG. 7 is a flow diagram that depicts a method for implementing call recovery using a numerical address for a called device in response to multiple call attempt failures in accordance with one or more implementations.

FIG. 7 depicts a method 700 for implementing call recovery using a numerical address for a called device in response to multiple call attempt failures in accordance with one or more implementations. At 702 a connection to an IP server is established based on multiple call failures over multiple radio access technologies. For instance, as described above, an IP call is established when multiple call failures occur on multiple other wireless RATs. In at least one implementation the IP call is established with an IP server that serves a particular communication application 114.

At 704 the IP server is requested to connect a call utilizing a numerical address for a called device. For instance, when an IP call is established based on a call failure, the connectivity module 112 communicates with an IP server via the IP call and requests that the IP server switch the IP call utilizing a numerical address for the called device. For example, the numerical address represents a telephone number for the called device, such as in a landline number format. The connectivity module 112, for instance, provides the numerical address for the called device and/or the IP server maintains a numerical address for the called device, e.g., where the called device maintains an account for the called device and/or a user of the called device.

At 706 the call is implemented as an IP call from the wireless device and a circuit switched call and/or a packet switched call to the called device. The IP server, for instance, connects the original IP call utilizing the numerical address as a circuit switched call over a circuit switched network, and/or a packet switched call over a packet switched network. For instance, the IP server accesses and/or negotiates with the circuit switched network and/or packet switched network to connect the call via the numerical address (e.g., phone number) for the called device. Thus, the call proceeds as an IP call between the calling device and the IP server and a circuit switched and/or packet switched call over a circuit switched network and/or packet switched network with the called device. For instance, connectivity with the called device can be established using a circuit switched connection, a packet switched connection, or a combination of circuit switched and packet switched connectivity.

Accordingly, techniques for call recovery for call failure are applicable to provide different call recovery technologies when multiple call failures occur.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
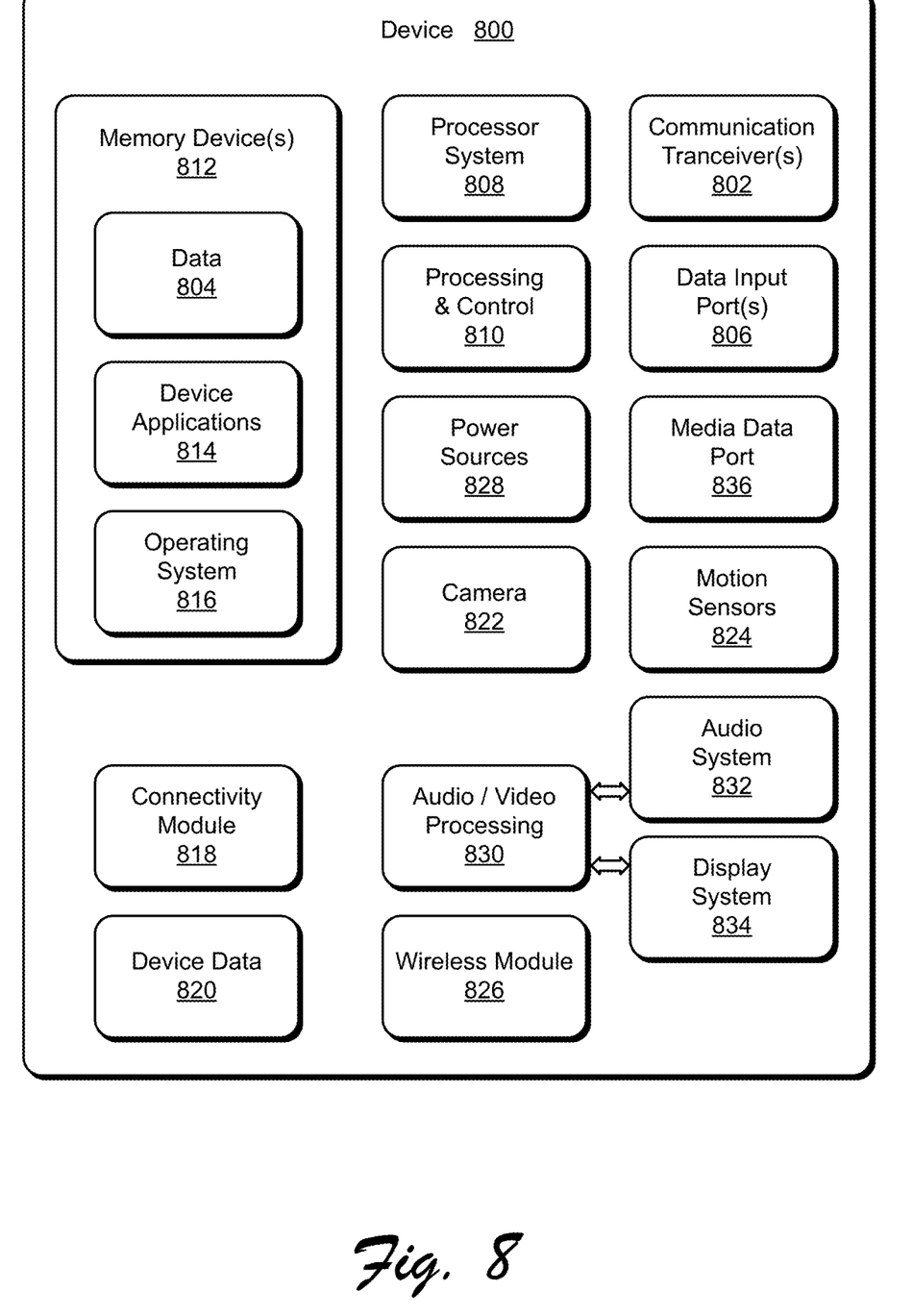
FIG. 8 illustrates various components of an example device that can implement aspects of call recovery for call failure.

FIG. 8 illustrates various components of an example device 800 in which aspects of call recovery for call failure can be implemented. The example device 800 can be implemented as any of the devices described with reference to the previous FIGS. 1-7, such as any type of wireless device, mobile phone, mobile device, wearable device, tablet, computing, communication, entertainment, gaming, media playback, and/or other type of electronic device. For example, the wireless devices 102 as shown and described with reference to FIGS. 1-7 may be implemented as the example device 800.

The device 800 includes communication transceivers 802 that enable wired and/or wireless communication of data 804 with other devices. The data 804 can include any of device identifying data, device location data, wireless connectivity data, and wireless protocol data. Additionally, the data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.11 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processor system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the data 804, other types of information and/or data, and various device applications 814 (e.g., software applications). For example, an operating system 816 can be maintained as software instructions with a memory device and executed by the processing system 808. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a connectivity module 818 that implements aspects of call recovery for call failure, and may be implemented with hardware components and/or in software as one of the device applications 814, such as when the device 800 is implemented as a wireless device 102. An example, the connectivity module 818 can be implemented as the connectivity module 112 described in detail above. In implementations, the connectivity module 818 may include independent processing, memory, and logic components as a computing and/or electronic device integrated with the device 800. The device 800 also includes device data 820 for implementing aspects of call recovery for call failure and may include data from the connectivity module 112.

In this example, the example device 800 also includes a camera 822 and motion sensors 824, such as may be implemented in an inertial measurement unit (IMU). The motion sensors 824 can be implemented with various sensors, such as a gyroscope, an accelerometer, and/or other types of motion sensors to sense motion of the device. The various motion sensors 824 may also be implemented as components of an inertial measurement unit in the device.

The device 800 also includes a wireless module 826, which is representative of functionality to perform various wireless communication tasks. For instance, for a wireless device 102, the wireless module 826 can be leveraged to scan for and detect wireless networks, as well as negotiate wireless connectivity to wireless networks for a wireless device 102. The device 800 can also include one or more power sources 828, such as when the device is implemented as a wireless device. The power sources 828 may include a charging and/or power system, and can be implemented as a flexible strip battery, a rechargeable battery, a charged super-capacitor, and/or any other type of active or passive power source. Generally, utilizing implementations of call recovery for call failure enables the power sources 828 to be conserved as part of a wireless network connectivity process.

The device 800 also includes an audio and/or video processing system 830 that generates audio data for an audio system 832 and/or generates display data for a display system 834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 836. In implementations, the audio system and/or the display system are integrated components of the example device. Alternatively, the audio system and/or the display system are external, peripheral components to the example device.

Although implementations of call recovery for call failure have been described in language specific to features and/or methods, the subject of the appended claims is not necessarily limited to the specific features or methods described. Rather, the features and methods are disclosed as example implementations of call recovery for call failure, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A wireless device including: a wireless module including components to initiate and receive wireless calls: and a connectivity module implemented to: determine that two or more call attempts for a call via two or more different radio access technologies fail; determine a wireless signal status for a third radio access technology at a location of the wireless device; determine based on the wireless signal status that the third radio access technology is usable to handle the call; and cause the wireless module to initiate the call via the third radio access technology.

In addition to the previously described wireless device, any one or more of the following: wherein the two or more different radio access technologies include a packet-switched call type and a circuit-switched call type; wherein the third radio access technology includes a different call type over at least one of the two or more radio access technologies; wherein the third radio access technology includes an Internet public data network, and wherein to determine the wireless signal status for the third radio access technology at the location of the wireless device includes to determine that connectivity to the Internet public data network meets a threshold signal condition; wherein the two or more call attempts for the call are implemented in response to a user interaction to initiate the call, and wherein the connectivity module is implemented to cause the wireless module to initiate the call via the third radio access technology independent of further user interaction; wherein the call includes a call directed to a further wireless device, and wherein the third radio access technology includes a direct wireless device-to-device call between the wireless device and the further wireless device: wherein to determine the wireless signal status for the third radio access technology at a location of the wireless device includes to determine that the further wireless device is in range at the location for the direct wireless device-to-device call between the wireless device and the further wireless device; wherein the third radio access technology includes an Internet Protocol (IP) call over an Internet public data network, and wherein the connectivity module is further implemented to: determine a preferred communication application for the wireless device for an IP call: and initiate the IP call utilizing the preferred communication application, wherein the IP call includes one or more of voice media or video media: wherein the third radio access technology includes an Internet Protocol (IP) call over an Internet public data network, and wherein the connectivity module is further implemented to: communicate with an IP server via the IP call and request that the IP server connect the call utilizing a numerical address for a called device, wherein the numerical address is usable to connect with the called device via one or more of a circuit switched connection or a packet switched connection; and implement the call as an IP call from the wireless device and the one or more of the circuit switched call or the packet switched call to the called device.

A method including: determining that two or more call attempts for a call on a wireless device via two or more different radio access technologies fail; determining a wireless signal status for a third radio access technology at a location of the wireless device; determining based on the wireless signal status that the third radio access technology is usable to handle the call; and causing the call to be initiated via the third radio access technology.

In addition to the previously described method, any one or more of the following: wherein the two or more different radio access technologies include two or more different wireless cellular radio access technologies, and the third radio access technology includes an Internet public data network: wherein the third radio access technology includes an Internet public data network, and wherein said determining the wireless signal status for the third radio access technology at the location of the wireless device includes determining that connectivity to the Internet public data network meets a threshold signal condition; wherein the two or more call attempts for the call are implemented in response to a user interaction to initiate the call, and said causing the call to be initiated via the third radio access technology is independent of further user interaction; wherein the call includes a call directed to a further wireless device, and wherein said causing the call to be initiated via the third radio access technology includes initiating a direct wireless device-to-device call between the wireless device and the further wireless device: wherein said determining the wireless signal status for the third radio access technology at a location of the wireless device includes determining that the further wireless device is in range at the location for the direct wireless device-to-device call between the wireless device and the further wireless device.

A method including: determining that an Internet Protocol (IP) call between a first device and a second device is to be initiated in response to one or more call failures on the first device experienced on one or more wireless radio access technologies; determining that an IP communication application is available on the first device; determining that the second device is online for the IP communication application; and causing the IP call to be initiated between the first device and the second device via the IP communication application.

In addition to the previously described method, any one or more of the following: wherein the one or more wireless radio access technologies include one or more wireless cellular networks; wherein said determining that the IP call between the first device and the second device is to be initiated is performed automatically and in response to the one or more call failures on the one or more wireless cellular networks; further including determining that the IP communication application is identified as a preferred communication application for the first device; further including, in conjunction with determining that the IP call is to be initiated, determining that IP connectivity for the first device meets a threshold signal condition.

The invention claimed is:

1. A wireless device comprising:
 a wireless module including components to initiate and receive wireless calls; and
 a connectivity module implemented to:
  present a configuration graphical user interface that provides call recovery settings, the call recovery settings including
   a prompt field that is selectable to cause a notification to be presented when a call recovery has been initiated, the notification providing a cancel control for cancelling the call recovery, the notification being presented for a specified period of time, the cancel control being selectable during the specified period of time to cancel the call recovery and, if the cancel control is not selected during the specified period of time that the notification is presented, the notification is removed and the call recovery proceeds;
  determine that an Internet Protocol (IP) call between the wireless device and a second device is to be initiated in response to one or more call failures on the wireless device experienced on one or more wireless radio access technologies;
  determine that an IP communication application is available on the wireless device;
  determine that the second device is online for the IP communication application;
  determine an IP connectivity status of the wireless device based at least in part on one or more of signal strength or signal quality for an IP network; and
  cause the IP call to be initiated between the wireless device and the second device via the IP communication application if the IP connectivity status indicates that the IP network meets one or more of a threshold signal strength or a threshold signal quality; or
  not attempt the IP call if the IP connectivity status indicates that the IP network does not meet the one or more of the threshold signal strength or the threshold signal quality.

2. The wireless device of claim 1, wherein the one or more wireless radio access technologies comprise one or more wireless cellular networks.

3. The wireless device of claim 2, wherein the connectivity module is implemented to determine that the IP call between the wireless device and the second device is to be initiated automatically and in response to the one or more call failures on the one or more wireless cellular networks.

4. The wireless device of claim 1, wherein the connectivity module is further implemented to determine that the IP communication application is identified as a preferred communication application for the wireless device and wherein, in conjunction with determining that the second device is online, further determining that the communication application is available and running on the second device and that a user is logged into the IP communication application.

5. The wireless device of claim 1, wherein the IP communication application is operable over a packet switched network.

6. The wireless device of claim 1, wherein the call recovery settings further include:
   an IP call field that is selectable to disable IP calling for call recovery; or
   a direct call field that is selectable to disable direct device-to-device calling for call recovery.

7. The wireless device of claim 1, wherein the connectivity module is further implemented to:
   determine that the IP connectivity status of the wireless device is unstable; and
   initiate a direct device-to-device wireless call between the wireless device and the second device.

8. A method comprising:
   providing a configuration graphical user interface that provides call recovery settings, the call recovery settings including
      a prompt field that is selectable to cause a notification to be presented when a call recovery has been initiated, the notification providing a cancel control for cancelling the call recovery, the notification being presented for a specified period of time, the cancel control being selectable during the specified period of time to cancel the call recovery and, if the cancel control is not selected during the specified period of time that the notification is presented, the notification is removed and the call recovery proceeds;
   determining that an Internet Protocol (IP) call between a first device and a second device is to be initiated in response to one or more call failures on the first device experienced on one or more wireless radio access technologies;
   determining that an IP communication application is available on the first device;
   determining that the second device is online for the IP communication application;
   determining an IP connectivity status of the wireless device based at least in part on one or more of signal strength or signal quality for an IP network; and
   causing the IP call to be initiated between the first device and the second device via the IP communication application if the IP connectivity status indicates that the IP network meets one or more of a threshold signal strength or a threshold signal quality; or
   not attempting the IP call if the IP connectivity status indicates that the IP network does not meet the one or more of the threshold signal strength or the threshold signal quality.

9. The method of claim 8, wherein the one or more wireless radio access technologies comprise one or more wireless cellular networks.

10. The method of claim 9, wherein said determining that the IP call between the first device and the second device is to be initiated is performed automatically and in response to the one or more call failures on the one or more wireless cellular networks.

11. The method of claim 8, further comprising determining that the IP communication application is identified as a preferred communication application for the first device and wherein, in conjunction with determining that the second device is online, further determining that the communication application is available and running on the second device and that a user is logged into the IP communication application.

12. The method of claim 8, wherein the IP communication application operates over a packet switched network.

13. The method of claim 8, wherein the call recovery setting further include:
   an IP call field that is selectable to disable IP calling for call recovery; or
   a direct call field that is selectable to disable direct device-to-device calling for call recovery.

14. The method of claim 8, further comprising:
   in conjunction with determining the IP connectivity status of the wireless device, determining that the IP connectivity status of the first device is unstable; and
   initiating a direct device-to-device wireless call between the first device and the second device.

15. A system comprising:
   a memory storing computer-executable instructions; and
   a processor configured to execute the computer-executable instructions to:
      present, with a first device, a configuration graphical user interface that provides call recovery settings, the call recovery settings including
         a prompt field that is selectable to cause a notification to be presented when a call recovery has been initiated, the notification providing a cancel control for cancelling the call recovery, the notification being presented for a specified period of time, the cancel control being selectable during the specified period of time to cancel the call recovery and, if the cancel control is not selected during the specified period of time that the notification is presented, the notification is removed and the call recovery proceeds;
      determine that an Internet Protocol (IP) call between the first device and a second device is to be initiated in response to one or more call failures on the first device experienced on one or more wireless radio access technologies;
      determine that an IP communication application is available on the first device;
      determine that the second device is online for the IP communication application;
      determine an IP connectivity status of the wireless device based at least in part on one or more of signal strength or signal quality for an IP network; and
      cause the IP call to be initiated between the first device and the second device via the IP communication application if the IP connectivity status indicates that the IP network meets one or more of a threshold signal strength or a threshold signal quality; or
      not attempt the IP call if the IP connectivity status indicates that the IP network does not meet the one or more of the threshold signal strength or the threshold signal quality.

16. The system of claim 15, wherein the one or more wireless radio access technologies comprise one or more wireless cellular networks.

17. The system of claim 16, wherein the processor is configured to execute the computer-executable instructions to determine that the IP call between the first device and the second device is to be initiated automatically and in response to the one or more call failures on the one or more wireless cellular networks.

18. The system of claim 15, wherein the processor is configured to execute the computer-executable instructions to determine that the IP communication application is identified as a preferred communication application for the first device and wherein, in conjunction with determining that the second device is online, further determine that the communication application is available and running on the second device and that a user is logged into the IP communication application.

19. The system of claim 15, wherein the call recovery setting further include:
   an IP call field that is selectable to disable IP calling for call recovery; or
   a direct call field that is selectable to disable direct device-to-device calling for call recovery.

20. The system of claim 15, wherein the processor is configured to execute the computer-executable instructions to:
   determine that the IP connectivity status of the first device is unstable; and
   initiate a direct device-to-device wireless call between the first device and the second device.

* * * * *